United States Patent Office 3,403,040
Patented Sept. 24, 1968

3,403,040
COATING COMPOSITION ADAPTED FOR OVERCOATING A WAX SURFACE
Lloyd I. Osipow, New York, N.Y., and Dorothea C. Marra, Summit, N.J., assignors to Fannie Roberts Heyman
No Drawing. Filed July 6, 1964, Ser. No. 380,629
10 Claims. (Cl. 106—173)

This invention relates to a coating composition which is adapted for coating a wax surface. More particularly, it relates to a coating composition which is non-toxic to human beings and to a dual coating consisting of a substrate of a pigmented wax film, and an outer coating which is non-toxic to human beings, non-smearing and highly flexible.

The coating composition in acordance with this invention is particularly adapted for cosmetic use as an overcoating for a film of cosmetic lipstick on human lips to prevent the lipstick from smearing or being transferred to objects which come into contact with the lips. It is also suitable for overcoating drawings made of wax crayon to prevent them from smearing, for overcoating a film of wax shoe polish and for many similar applications.

Cosmetic lipstick has come into almost universal use by women. Lipstick comprises essentially a plasticized, wax composition carrying a pigment, a dye, or both. Both users and manufacturers of lipsticks have been aware for many years of the limitations of lipsticks. The principal objectionable feature of lipstick is that it is readily transferred from the lips of the wearer to all objects that come in contact with the lips. The so-called "indelible" lipsticks are less readily transferred to contacting objects. However, they do transfer excessively and they have the further disadvantages of causing the lips to become dry and to tend to cause sensitization and allergic reactions.

Attempts have herefore been made to overcome the objectionable smearing and transfer of lipstick films to other objects, by the provision of coating compositions which can be applied over the lipstick film to deposit a second, overcoating film, which retains the film of lipstick on the lips. Such coating compositions have been on the market for a number of years, but have had little commercial success. This has arisen from the fact that these compositions have had a variety of defects and objectionable features.

The formulations of a coating film which is suitable for preventing the transfer of lipstick to objects coming into contact with the lips is a difficult problem. The human lips provide a flexible and elastic base surface, which require a highly flexible and elastic coating. In addition, the coating requires the use of non-toxic materials which, upon application to the lips, do not give unpleasant sensations to the user, such as smarting or stinging.

Our U.S. Patent No. 2,936,245, issued May 10, 1960, discloses and claims a coating composition which is adapted for overcoating wax surfaces, particularly films of lipstick on human lips. As brought out by that patent, the coating compositions which had been developed earlier were either aqueous solutions which produced water-sensitive film or organic solvent solutions which caused a highly undesirable burning and smarting sensation when applied over a film of lipstick on human lips. The coating composition disclosed by that patent avoids many of the disadvantages of prior compositions which had been earlier disclosed for this purpose. Its most notable superiority over the prior compositions arises from the fact that upon application to a film of lipstick on human lips, it minimizes or wholly avoids the stinging and smarting sensation produced by the earlier compositions carrying organic solvents.

Although the composition disclosed and claimed by our U.S. Patent No. 2,936,245 is a definite advance in the art which has met with commercial success, it has revealed an unexpected disadvantage in a phenomenon which is surprising and difficult to explain on a reasonable technical basis. Under conditions of high atmospheric humidity, a film deposited by this composition on a wax surface such as a film of lipstick tends to become tacky. Any tackiness or stickiness of the film on the lips is objectionable. This phenomenon is surprising since it does not appear when the composition is applied to a non-waxy surface such as, for example, that of a glass plate.

The composition of that patent has the highly desirable quality of producing a soft, flexible and glossy film when applied to a film of lipstick or other wax surface. However, this film wears off rapidly because of its inherent softness and is effective in preventing the transfer of lipstick for only a few hours. Although a period of a few hours is usually adequate for the purpose, an increase in the time of protection is desirable.

Now, in accordance with this invention, we provide a composition which avoids the disadvantages of the compositions of our U.S. Patent No. 2,936,245 set forth above, while retaining its advantages and particularly that of not producing a stinging and smarting sensation when applied over lipstick on the human lips. This invention is the result of our continued research on these compositions which has demonstrated that we can retain the advantageous properties of the compositions disclosed by our U.S. Patent No. 2,936,245, while eliminating their disadvantages by the substitution of ethyl cellulose for the ethyl hydroxyethyl cellulose of its compositions.

The coating composition in accordance with this invention comprises essentially a solution of ethyl cellulose in a solvent composed of a mixture of ethanol, and a voltatile, completely halogenated fluorine-containing hydrocarbon, which is a liquid at 25° C. when under normal atmospheric pressure. The volatile, completely halogenated hydrocarbon which we use preferably contains a minimum of one fluorine atom per carbon atom, and boils within the range of about 40° C. to about 100° C. Under normal atmospheric pressure. Suitable volatile fluorine-containing completely halogenated hydrocarbons for this purpose are, for example, 1,2,2-trifluoro-1,1,2-trichloroethane and dichlorohexafluorocyclobutane. This coating composition will, in addition, preferably include a plasticizer for the ethyl cellulose.

Ethyl cellulose is soluble in ethanol and ethanol would appear to be a satisfactory solvent, when used alone, for this composition from the standpoint of its pleasant odor and lack of toxicity. However, it gives an unpleasant stinging and smarting sensation when applied to the lips. This stinging and smarting sensation continues until the ethanol has evaporated from the composition. The research which has resulted in this invention has demonstrated that the addition of hydrocarbon solvents which are more volatile than ethanol, such as hexane or octane, to the composition, increases the stinging and smarting sensation given by ethanol alone. On the other hand, the addition of less volatile aliphatic hydrocarbon solvents, such as, deodorized kerosene to the composition, causes the resultant film to be weak and tenuous. Other volatile solvents commonly used as coating compositions, such as the ketones, aromatic hydrocarbons, chlorinated solvents, and the higher boiling solvents, are objectionable because of odor, toxicity, or both.

Our research has demonstrated the surprising fact that the fluorine-containing, completely halogenated hydrocarbon solvents, when admixed with ethanol, materially reduced the tendency of the ethanol to cause a stinging and smarting sensation when applied to the lips, and the solutions of ethyl cellulose do not become tacky upon drying, and produce a strong, cohesive film. The fluorine-containing, completely halogenated hydrocarbon solvents are well known to be relatively non-toxic and to be unobjectionable in odor. They are entirely suitable, in admixture of ethanol, for application to the human lips.

The relative proportions of ethanol and of the volatile, fluorine-containing hydrocarbon solvents, which are used as a solvent mixture for the ethyl cellulose in the coating composition in accordance with this invention, can be varied over wide limits. The volatile, fluorine-containing hydrocarbon solvents are relatively expensive and for this reason, it is preferable to use a minor proportion of this solvent and a major proportion of the cheaper ethanol. Thus, for example, the solvent mixture used in this coating composition may contain an amount of the fluorine-containing hydrocarbon solvent within the range of about 15%, by weight, to about 50%, by weight, and an amount of ethanol within the range of about 85%, by weight, to about 50%, by weight.

An amount of ethyl cellulose within the range of about 1%, by weight, to about 10%, by weight, is used in the composition. When using a high viscosity type of ethyl cellulose, we prefer to use an amount within the range of about 2%, by weight, to about 4%, by weight. We prefer to use an amount of a low viscosity type of ethyl cellulose within the range of about 4%, by weight, to about 8%, by weight.

The ethylcellulose used in this composition is preferably of the high viscosity type. A high viscosity grade of ethyl cellulose which has a viscosity of, for example, 125 to 250 centipoises when measured at 25° C. using a 5% solution, by weight, of the ethyl cellulose in a mixed solvent consisting of 80 parts of toluene and 20 parts of ethanol, is entirely suitable for this purpose.

We may include any non-toxic resin that is soluble in the solvent combination and compatible with ethyl cellulose. Suitable resins for this purpose include copal gum, shellac, wood rosin, hydrogenated rosin, alkyd resins, coumarone resins and phenolic resins. We may also include a plasticizer in this composition. Suitable plasticizers are, for example, the methyl ester of hydrogenated rosin, hydroabietyl alcohol, dioctyl phthalate, methylphthalylethyl glycolate, castor oil and acetyl tributyl citrate. The concentration of resin and plasticizer included in these compositions are not critical and they may even be omitted. In general, however, we prefer to use about 10% to about 30% by weight of each of a resin and of a plasticizer based on the weight of the ethyl cellulose contained in the composition.

The coating compositions in accordance with this invention are specifically illustrated by the following Examples 1–6, inclusive.

|  | Parts by weight | | | |
|---|---|---|---|---|
| Example No | 1 | 2 | 3 | 4 |
| Ethyl cellulose, 50 cps | 2.0 | 4.0 | 3.0 | 3.0 |
| Shellac, bleached | 0.3 |  | 0.2 | 0.6 |
| Wood rosin |  | 0.5 | 0.2 |  |
| Castor oil | 0.5 |  |  |  |
| Methyl phthalyl ethyl glycolate |  | 0.6 |  | 0.6 |
| 1,2,2-trifluoro-1,1,2-trichloroethane | 30.0 | 25.0 | 30.0 | 40.0 |
| Ethanol | 67.2 | 69.9 | 66.6 | 55.8 |
| Perfume and flavor | 0.5 | 0.5 | 0.5 | 0.5 |

|  | Parts by weight | | |
|---|---|---|---|
| Example No | 5 | 6 | 7 |
| Ethyl cellulose, 50 cps | 3.0 | 3.0 | 3.0 |
| Copal gum | 0.3 | 0.3 |  |
| Shellac, bleached | 0.2 | 0.2 |  |
| Acetyl tributyl citrate |  | 0.7 |  |
| Ethanol | 56.5 | 55.8 | 57.0 |
| 1,2,2-trifluoro-1,1,2-trichloroethane | 40.0 | 40.0 | 40.0 |

The following coating compositions, representative of those disclosed and claimed by our U.S. Patent No. 2,936,245 are directly comparable to the compositions of Examples 5, 6 and 7 illustrating the present invention.

|  | Parts by weight | | |
|---|---|---|---|
| Example No | 8 | 9 | 10 |
| Ethyl hydroxyethyl cellulose (high viscosity) | 3.0 | 3.0 | 3.0 |
| Copal gum | 0.3 | 0.3 |  |
| Shellac, bleached | 0.2 | 0.2 |  |
| Acetyl tributyl citrate |  | 0.7 |  |
| Ethanol | 56.5 | 55.8 | 57.0 |
| 1,2,2-trifluoro-1,1,2-trichloroethane | 40.0 | 40.0 | 40.0 |

To secure a direct comparison between the compositions of this invention with those disclosed by our U.S. 2,936,245, films of the compositions of Examples 5–10, inclusive, were applied to clean glass slides and allowed to dry thoroughly. The resulting films were compared for hardness by marking with a graded series of pencils. The hardness of these films in order of decreasing hardness were as follows: Example 5, Example 6, Examples 7 and 8 equal Example 9 and Example 10. Thus, the ethyl cellulose films were clearly harder than the corresponding ethyl hydroxyethyl cellulose films. None of these films became tacky when stored in a cabinet in an atmosphere having a 90% relative humidity.

A further comparison was made between the compositions of Examples 5, 6 and 7 on one hand with Examples 8, 9 and 10 on the other, by applying each of the compositions to a glass slide which had been coated with a layer of lipstick. After thorough drying, it was found that all of the films were significantly softer than the same films applied directly to glass as described in the foregoing. However, it was found that the films produced by the compositions of Examples 5 and 6 were substantially harder than the others.

Each of the films from Examples 5, 6, 7, 8, 9 and 10 by overcoating a layer of lipstick on a glass slide were stored in a cabinet in an atmosphere having a 90% relative humidity. After this storage, all of the films based on ethyl cellulose, i.e., the films deposited from the compositions of Examples 5, 6 and 7 were free from tack. In direct contrast, after this storage, all of the films based on ethyl hydroxyethyl cellulose, i.e., the films deposited from the compositions of Examples 8, 9 and 10 were tacky.

Thus, these tests showed that a layer of lipstick under films based on ethyl hydroxyethyl cellulose caused the overcoating films of ethyl hydroxyethyl cellulose to become tacky, whereas a parallel phenomenon was not observed with the ethyl cellulose compositions. As already noted, neither the ethyl hydroxyethyl cellulose nor the ethyl cellulose compositions applied directly to glass surfaces became tacky under conditions of high relative humidity. Although there is no question as to the existence of this phenomenon with ethyl hydroxyethyl cellulose and its absence in the case of ethyl cellulose, we are at a loss for any reasonable technical explanation thereof.

The six compositions of Examples 5–10, inclusive, were also tested by application over lipstick coated on women's lips. The dry films of the ethyl cellulose compositions (Examples 5, 6 and 7) remained free of tack under conditions of high relative humidity, while the dry films based on ethyl hydroxyethyl cellulose developed significant tack under the same conditions of high relative humidity. The ethyl cellulose films from the compositions of Examples 5, 6 and 7 were better than the ethyl hydroxyethyl cellulose films of Examples 8, 9 and 10 with regard to the retention of the lipstick and the prevention of its transfer to other surfaces such as cigarettes and coffee cups. Of the ethyl hydroxyethyl cellulose films, it was found that those from the compositions of Examples 8 and 9 which contained hard resins were superior in preventing the transfer of lipstick to the film from the composition of Example 10 which contained no resin.

The exact composition of the wax surface to which the composition in accordance with this invention is applied will depend upon the purpose of the composition. Thus, the composition of a lipstick is somewhat different from that of a wax crayon, while a wax shoe polish has still a somewhat different composition. However, all three types of compositions are alike in that they include both a wax and a pigment and are adapted to be spread as a film on a flexible surface.

The wax surface to which the coating composition in accordance with this invention is applied will be specifically illustrated by the following Examples 11–14, inclusive, of smearable lipstick compositions of the type now widely used. These compositions have been found highly satisfactory, except for their objectionable smearability.

Example 11

| | Parts by wt. |
|---|---|
| Beeswax | 10 |
| Candelilla wax | 2.5–5 |
| Castor oil | 40 |
| Pigment | 15 |
| Dye | 1–2 |

Example 12

| | Parts by wt. |
|---|---|
| Lanolin | 10 |
| Carnauba wax | 2.5 |
| Microcrystalline wax | 5–10 |
| Castor oil | 35 |
| Pigment | 12.5 |
| Dye | 2.5 |

Example 13

| | Parts by wt. |
|---|---|
| Microcrystalline wax | 10–15 |
| Isopropyl myristate | 10–15 |
| Beeswax | 10 |
| Mineral oil (bland) | 20 |
| Propylene glycol | 5 |
| Pigment | 20 |
| Dye | 1.5 |

Example 14

| | Parts by wt. |
|---|---|
| Lanolin | 7.5 |
| Paraffin | 10–15 |
| Ozocerite wax | 10–15 |
| Mineral oil | 15 |
| Castor oil | 15 |
| Vaseline | 5 |
| Pigment | 12 |
| Dye | 10 |

While by the foregoing Examples 11–14, we have specifically illustrated compositions of lipstick surfaces to which the coating composition in accordance with this invention may be applied, it will be fully understood that it is suitable for application to any wax surface. The surface may be composed essentially of any of the waxes listed in the foregoing Examples 11–14 thereof, or of other waxes, such as, for example, cellulose stearate, cellulose palmitate, sorbitol stearate, sorbitol palmitate, mannitol stearate, mannitol palmitate, erylthritol stearate, erythritol palmitate, or mixtures thereof.

The coating film over the wax surface which is deposited from the coating composition in accordance with this invention comprises essentially ethyl cellulose and preferably contains a plasticizer and consists of all ingredients of the coating composition, except the volatile solvents therein, i.e., the ethanol and the completely halogenated hydrocarbon.

In the foregoing, many specific details as to the coating composition and the combination of a wax surface and the coating of film in accordance with this invention have been given for the purpose of fully explaining the invention. However, it will be understood that many changes can be made in these details without departing from the spirit of the invention or the scope of the following claims.

What is claimed is:

1. A coating composition adapted for the overcoating of a wax surface, which consists essentially of about 1%, by weight, to about 10%, by weight, of a liquid solution of ethyl cellulose in an organic solvent mixture of ethanol and a volatile, completely halogenated fluoro-chloro hydrocarbon, which is a liquid at 25° C. when under atmospheric pressure.

2. A coating composition adapted for the overcoating of a wax surface which consists essentially of a solution of about 1%, by weight, to about 10%, by weight, of ethyl cellulose in a solvent mixture of an amount of ethanol within the range of about 50%, by weight, to about 85%, by weight, and of an amount of a completely halogenated fluoro-chloro hydrocarbon solvent, which is a liquid at about 25° C. when under atmospheric pressure, within the range of about 50%, by weight, to about 15%, by weight.

3. A coating composition adapted for the overcoating of a wax surface which consists essentially of a solution of about 1%, by weight, to about 10%, by weight, of ethyl cellulose in a solvent mixture consisting of about 50%, by weight, to about 85%, by weight, of ethanol and about 50% by weight, to about 15%, by weight, of a fluoro-chloro hydrocarbon which is completely halogenated and which has a boiling point within the range of about 40° C. to about 100° C. at an atmospheric pressure.

4. A coating composition adapted for the overcoating of a wax surface which consists essentially of a solution of about 1%, by weight, to about 5%, by weight, of an ethanol soluble type of ethyl cellulose of a high viscosity type in an organic solvent mixture of ethanol and a volatile completely halogenated fluoro-chloro hydrocarbon, which is a liquid at 25° C. when under atmospheric pressure.

5. A coating composition adapted for the overcoating of a wax surface which consists essentially of a solution of about 1%, by weight, to about 10%, by weight, of an ethanol soluble type of ethyl cellulose, and a plasticizer which is compatible with the ethyl cellulose in an organic solvent mixture of ethanol and a volatile, completely halogenated fluoro-chloro hydrocarbon which is a liquid at 25° C. when under atmospheric pressure.

6. A coating composition adapted for the overcoating of a wax surface which consists essentially of a solution of about 1%, by weight, to about 10%, by weight, of ethyl cellulose, and a resin selected from the group consisting of copal gum, shellac, wood rosin, hydrogenated rosin, alkyd resins, coumarone resins and phenolic resins in an organic solvent mixture of ethanol and a volatile, completely halogenated fluoro-chloro hydrocarbon which is a liquid at 25° C. when under atmospheric pressure.

7. A coating composition adapted for the overcoating of a wax surface which consists essentially of a solution of about 1%, by weight, to about 10%, by weight, of an ethanol soluble type of ethyl cellulose and a plasticizer which is compatible with the ethyl cellulose in an amount within the range of about 10%, by weight, to about 30%, by weight, of the ethyl cellulose present, in an organic solvent mixture of ethanol and a volatile, completely halogenated fluoro-chloro hydrocarbon which is completely halogenated and has a boiling point within the range of about 40° C. to about 100° C. at atmospheric pressure.

8. A coating composition adapted for the overcoating of a wax surface which consists essentially of a solution of about 1%, by weight, to about 10%, by weight, of ethyl cellulose in an organic solvent mixture of ethanol and 1,2,2-trifluoro-1,2,2-trichloroethane.

9. A coating composition adapted for the overcoating of a wax surface which consists essentially of a solution of about 1%, by weight, to about 10%, by weight, of ethyl cellulose in an organic solvent mixture of ethanol and dichlorohexafluorocyclobutane.

10. A coating composition adapted for the overcoating of a film of lipstick on the human lips which consists of a solution of about 1%, by weight, to about 10%, by weight, of ethyl cellulose, a plasticizer for the ethyl cellulose in an amount within the range of about 10%, by weight, to about 30%, by weight, of the ethyl cellulose and a minor amount of a perfume and flavor material, in an organic solvent mixture of about 50%, by weight, to about 85%, by weight, of ethanol and about 50%, by weight, to about 15%, by weight, of a volatile, completely halogenated fluoro-chloro hydrocarbon which is completely halogenated and has a boiling point within the range of about 40° C. to about 100° C. at atmospheric pressure.

References Cited

UNITED STATES PATENTS

| | | | |
|---|---|---|---|
| 2,684,915 | 7/1954 | Tinsley | 106—190 X |
| 2,740,723 | 4/1956 | Voris | 106—197 X |
| 2,857,314 | 10/1958 | Phillips | 106—197 X |
| 2,883,350 | 4/1959 | Baudecroux et al. | 106—189 X |
| 2,936,245 | 5/1960 | Osipow et al. | 106—189 |

JAMES A. SEIDLECK, *Primary Examiner.*

L. B. HAYES, *Assistant Examiner.*